UNITED STATES PATENT OFFICE.

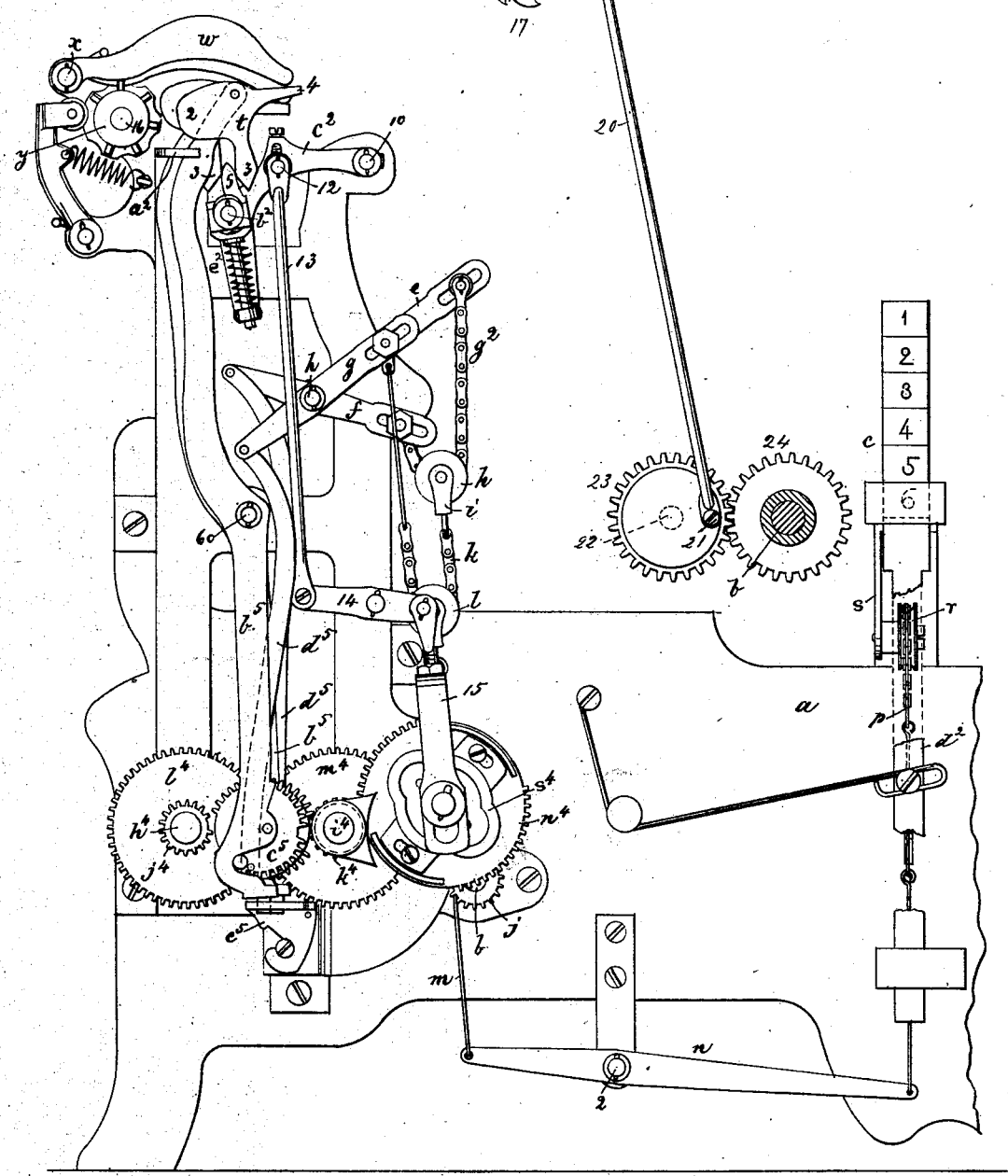

GEORGE CROMPTON AND HORACE WYMAN, OF WORCESTER, MASS., ASSIGNORS TO SAID CROMPTON.

LOOM.

SPECIFICATION forming part of Letters Patent No. 236,990, dated January 25, 1881.

Application filed May 18, 1880. (Model.)

*To all whom it may concern:*

Be it known that we, GEORGE CROMPTON and HORACE WYMAN, of Worcester, county of Worcester, and State of Massachusetts, have invented an Improvement in Looms, of which the following description, in connection with the accompanying drawings, is a specification.

This invention relates to looms, and has special reference to mechanism for operating the shuttle-boxes, and the invention herein shown is adapted to operate a series of drop-boxes containing six cells.

Our invention, among other things, consists in two or more shifting-levers, their toothed cranks and connecting-rods adapted to operate the shuttle-box levers, weighted selectors pivoted upon the shifting-levers, fingers, pattern-surface to raise or lower them, and means to operate the pattern-surface, combined with a series of wedges or toes, a lever or arm to carry them, and means to actuate the said arm or lever, whereby the said wedges or toes are made to strike the selectors, as hereinafter described; also, in an arm or lever having a yielding bar, combined with a series of wedges or toes mounted thereon, and to operate as hereinafter described.

Figure 1 represents, in side elevation, a sufficient portion of a loom-frame to illustrate our invention; Fig. 2, a detached view of the lever or arm that carries the wedges or toes, and a cross-section of it on the dotted line therein shown; and Fig. 3, a detail to illustrate devices by which to rotate the pattern-surface.

In the drawings, $a$ is supposed to represent a loom-frame of any suitable shape; $c$, a series of six shuttle-boxes carried by the lay $d$, and $d^2$ the shuttle-box rod.

The rotating toothed wheel $n^4$, the pinion $j$ on the rotating shaft $b$, the cam $s^4$, the toothed gear $l^4 m^4$, the long gears $j^4 k^4$, the toothed cranks $c^5$, the guide $e^5$, the shifting-levers $b^5$, and connecting-rods are all as in United States Letters Patent No. 230,243, July 20, 1880, to which reference may be had.

The shuttle-box levers $e f g$, each attached at its rear end with one of the connecting-rods $d^5$, and slotted at their outer ends, are all mounted on the same fulcrum, and are moved by the said connecting-rods, the toothed cranks $c^5$ of which are actuated all in a well-known manner. The adjacent levers $e f$ have connected with their outer ends the chain $g^2$, upon which rides the running-sheave $h$.

The frame $i$ of sheave $h$ has connected with it one end of a chain, $k$, that at its other end is connected with the third lever, $g$. This chain $k$ sustains the second running-sheave, $l$, the frame of which is connected by a link, $m$, or chain, with, as herein shown, a lever, $n$, pivoted, at 2, to a stud of the loom-frame.

The forward end of the lever $n$ has attached to it a suitable chain, $p$, extended over a guiding-sheave, $r$, held on the stud of a bracket, $s$, secured to the lay, the said chain being thereafter secured to the box-rod $d^2$.

The levers $e g$, moved singly, will operate the shuttle-boxes for a distance of two cells and the lever $f$ the distance of one cell.

The shifting-levers $b^5$, at their upper ends, have connected with them the selectors $t$, herein shown as having three arms, 2 3 4. The rear arms, 2, are weighted, so as to normally stand as indicated by the selector at the front in Fig. 1. The arms 3 are pointed or inclined at their lower ends, to be struck by the wedges or toes 5 as they are raised and lowered, as herein described. The arms 4 are extended forward, to be struck by the ends of the fingers $w$, pivoted at $x$ and resting upon the pattern-surface $y$.

When the pins or protuberances of the pattern-surface pass from beneath the fingers they descend, and, acting at their front ends on the arms 4 of the selectors, turn the latter about their pivots into the position shown in Fig. 1 by the second selector of the series, so that the wedge or toe opposite it will strike the front incline at the end of the arm 3, causing the shifting-lever by which the said selector is carried to be turned in the direction to engage the toothed crank $c^5$ upon it with the long gear $k^4$. The upper ends of the shifting-levers are steadied by a comb-like guide, $a^2$.

The wedges or toes 5, placed side by side upon a rod, $b^2$, fixed to an arm or lever, $c^2$, are pivoted with shoulders 7 8, that rest on a yielding bar, $d^3$, having a stem surrounded by a spring, $e^2$, supported at its lower end by a part, $f^2$, of the arm $c^2$. This yielding bar permits the wedges or toes to yield a little, if necessary, when rising in contact with the arms 3 of the selectors, to obviate injury to any of the parts, if obstructed.

The arm or lever $c^2$, pivoted at 10, has an adjustable pin, 12, that is engaged by a rod or link, 13, connected with lever 14, joined at its opposite end with the adjustable link 15, having a roller or other stud that projects into the groove of the cam $s^4$.

The shaft 16 for the pattern surface or cylinder $y$ has attached to it, at one end, the usual ratchet 17, engaged by the pawl 18 on the pawl-carrier 19, connected by link 20 with a crank-pin, 21, carried by a shaft, 22, which has a pinion, 23, that is engaged by a pinion, 24, on the shaft $b$, or in any other usual or common way.

We claim—

1. In a loom, two or more shifting-levers, their toothed cranks and connecting-rods adapted to operate the shuttle-box levers, the weighted selectors $t$, pivoted upon the shifting-levers, the fingers, the pattern-surface to raise and lower them, means to operate the pattern-surface, combined with a series of wedges or toes, a lever or arm to carry them, and means to actuate the said arm or lever and cause the wedges or toes to strike the arms 3 of the selectors, as and for the purpose described.

2. The arm or lever $c^2$, its rod, and wedges or toes 5 mounted thereon, combined with the yielding bar, to permit the said wedges or toes to yield, as described.

In testimony whereof we have signed our names to this specification in the presence of two subscribing witnesses.

GEO. CROMPTON.
HORACE WYMAN.

Witnesses:
J. B. SYME.
J. A. WARE.